US011161196B2

(12) United States Patent
Nakai et al.

(10) Patent No.: US 11,161,196 B2
(45) Date of Patent: Nov. 2, 2021

(54) METALLIC MEMBER BONDING DEVICE FOR PRESSING ROD-SHAPED OR CYLINDRICAL FIRST METALLIC MEMBER INTO HOLE PORTION OF ANNULAR SECOND METALLIC MEMBER TO BOND THE SAME AND BONDING METHOD THEREFOR

(71) Applicant: MAZDA MOTOR CORPORATION, Hiroshima (JP)

(72) Inventors: Masanori Nakai, Hiroshima (JP); Akira Hashimoto, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 342 days.

(21) Appl. No.: 15/674,567

(22) Filed: Aug. 11, 2017

(65) Prior Publication Data
US 2018/0056433 A1 Mar. 1, 2018

(30) Foreign Application Priority Data
Aug. 26, 2016 (JP) .............................. JP2016-165901

(51) Int. Cl.
*B23K 11/20* (2006.01)
*B23K 11/24* (2006.01)
(Continued)

(52) U.S. Cl.
CPC .......... *B23K 11/20* (2013.01); *B23K 11/0046* (2013.01); *B23K 11/241* (2013.01);
(Continued)

(58) Field of Classification Search
CPC ..... B23K 11/16; B23K 11/20; B23K 11/0046; B23K 11/241; B23K 20/02;
(Continued)

(56) References Cited

U.S. PATENT DOCUMENTS 3,950,841 A * 4/1976 Conn ................. B23K 11/0093
228/125
4,810,848 A * 3/1989 Kazlauskas .......... B23K 9/0286
219/59.1
(Continued)

FOREIGN PATENT DOCUMENTS

CN 1545439 A 11/2004
CN 101176961 A 5/2008
(Continued)

OTHER PUBLICATIONS

An Office Action mailed by the State Intellectual Property Office of the People's Republic of China dated Aug. 1, 2019, which corresponds to Chinese Patent Application No. 201710727132.8 and is related to U.S. Appl. No. 15/674,567.
(Continued)

*Primary Examiner* — Justin C Dodson
(74) *Attorney, Agent, or Firm* — Studebaker & Brackett PC

(57) ABSTRACT

A metallic member bonding device includes a pressurizing unit, a current supply unit, and a deformation suppressing unit. The pressurizing unit pressurizes a first metallic member toward a hole portion of a second metallic member to press the first metallic member therein. The current supply unit supplies a welding current between the first metallic member and the second metallic member. The deformation suppressing unit suppresses deformation of one of the first metallic member and the second metallic member, the one member having a constituent metallic material with at least one of a proof stress and a melting temperature lower than that of the other member, the deformation being in a direction of a cross section crossing a direction of the press-in. Then, the deformation suppressing unit is provided
(Continued)

in a region covering at least a plastic flow range in the press-in direction.

10 Claims, 10 Drawing Sheets

(51) Int. Cl.
    *B23K 31/00*     (2006.01)
    *B23K 20/26*     (2006.01)
    *B23K 20/02*     (2006.01)
    *B23K 20/227*     (2006.01)
    *B23K 20/24*     (2006.01)
    *B23K 11/00*     (2006.01)
    *B23K 103/20*     (2006.01)

(52) U.S. Cl.
    CPC .......... *B23K 20/02* (2013.01); *B23K 20/2275* (2013.01); *B23K 20/24* (2013.01); *B23K 20/26* (2013.01); *B23K 31/003* (2013.01); *B23K 2103/20* (2018.08)

(58) Field of Classification Search
    CPC .... B23K 20/2275; B23K 20/24; B23K 20/26; B23K 21/003; B23K 31/003
    USPC ...... 219/78.01, 117.1, 118, 81, 82, 83, 86.1, 219/86.22, 86.24, 86.33, 86.51; 123/90.48, 90.51; 29/888.43
    See application file for complete search history.

(56) References Cited

U.S. PATENT DOCUMENTS

| | | | |
|---|---|---|---|
| 5,743,222 | A | 4/1998 | Adachi |
| 5,809,644 | A | 9/1998 | Adachi |
| 6,552,292 | B1* | 4/2003 | Nomura .................... B23K 1/19 219/148 |
| 2006/0124604 | A1 | 6/2006 | Miyamoto et al. |
| 2007/0023401 | A1* | 2/2007 | Tsukamoto .......... B23K 11/002 219/86.22 |
| 2009/0078682 | A1 | 3/2009 | Feng |
| 2009/0212025 | A1 | 8/2009 | Zuo et al. |
| 2011/0155701 | A1* | 6/2011 | Gerst ................. B23K 11/0026 219/117.1 |
| 2011/0163074 | A1* | 7/2011 | Kaga .................... B23K 11/087 219/83 |
| 2012/0125896 | A1* | 5/2012 | Vargas ................ A61F 2/30907 219/108 |
| 2012/0294671 | A1* | 11/2012 | Dietrich .................. F16D 1/068 403/270 |
| 2015/0001004 | A1 | 1/2015 | Beenken et al. |
| 2015/0096781 | A1* | 4/2015 | Fichtner ............. H01B 13/0006 174/102 R |

FOREIGN PATENT DOCUMENTS

| | | |
|---|---|---|
| CN | 102513684 A | 6/2012 |
| CN | 104220203 A | 12/2014 |
| FR | 562253 A | 11/1923 |
| JP | S49-117330 U | 10/1974 |
| JP | S50-44955 A | 4/1975 |
| JP | S54-99751 A | 8/1979 |
| JP | H04-187388 A | 6/1992 |
| JP | H04-187388 A | 7/1992 |
| JP | H07-256465 A | 10/1995 |
| JP | H09-112217 A | 4/1997 |
| JP | H11-320120 A | 11/1999 |
| JP | 2004-017070 A | 1/2004 |
| JP | 2004-239271 A | 8/2004 |
| JP | 2005-342782 A | 12/2005 |
| JP | 2006-181627 A | 7/2006 |
| JP | 2006263809 A | 10/2006 |
| JP | 2006289527 A | 10/2006 |
| JP | 2012-125809 A | 7/2012 |

OTHER PUBLICATIONS

A Notification mailed by the Japanese Patent Office dated May 15, 2018, which corresponds to Japanese Patent Application No. 2016-165901 and is related to U.S. Appl. No. 15/674,567; with an English summary.

A Notification mailed by the Japanese Patent Office dated Oct. 23, 2018, which corresponds to Japanese Patent Application No. 2016-165901 and is related to U.S. Appl. No. 15/674,567; with partial English translation.

An Office Action issued by the Japanese Patent Office dated Jan. 30, 2018, which corresponds to Japanese Patent Application No. 2016-165901 and is related to U.S. Appl. No. 15/674,567 with an English Translation.

An Office Action mailed by the State Intellectual Property Office of the People's Republic of China dated Mar. 12, 2020, which corresponds to Chinese Patent Application No. 201710727132.8 and is related to U.S. Appl. No. 15/674,567; with partial English translation.

Zhang Yingli et al., "Modern Welding Technology", Jindun Publishing House, Chapter 8 'Resistance Welding', Aug. 2011, pp. 372-378; with English translation of the last page of the Office Action related to this document.

An Office Action mailed by the Japanese Patent Office dated May 26, 2020, which corresponds to Japanese Design Application No. 2018-179999 with English translation.

* cited by examiner

METALLIC MEMBER BONDING DEVICE FOR PRESSING ROD-SHAPED OR CYLINDRICAL FIRST METALLIC MEMBER INTO HOLE PORTION OF ANNULAR SECOND METALLIC MEMBER TO BOND THE SAME AND BONDING METHOD THEREFOR

TECHNICAL FIELD

The present invention relates to a metallic member bonding device and a bonding method therefor.

BACKGROUND ART

As a method of bonding a first metallic member having a rod shape or a cylindrical shape and a second metallic member having an annular shape, a bonding method is employed in which while pressing one of the members into a hole portion of the other member, a large current is passed through the members in a short period of time. Specifically, first, a cross section of the first metallic member is set to be larger in size than a cross section of the hole portion of the second metallic member. Additionally, a front end portion of the first metallic member is tapered and an opening edge of the hole portion of the second metallic member is also tapered.

Next, with the first metallic member fitted to the hole portion of second metallic member, a large current is passed in a short period of time while pressurizing. As a result, an outer circumferential surface of the first metallic member and one side interface portion of the second metallic member are softened and plastically fluidized so as to cause solid-phase bonding at the interface portion.

In the above bonding method, since a large current is applied in a short period of time, a bonding portion and a periphery thereof are unlikely to have a burn or a strain to therefore enable highly precise bonding. Additionally, as compared with bonding using arc welding or brazing, further cost-down can be realized.

JP 2006-181627 A discloses a technique for bonding different kinds of metals having physical properties (melting temperature, proof stress, and the like) different from each other in order to realize weight reduction and cost-down.

However, when adopting such a bonding method as described above according to the conventional art for bonding different kinds of metals having physical properties different from each other, it is necessary to have a large amount of upset in order to ensure a bonding strength, which leads to an increase in scale and weight of a bonding part.

Description will be made of matters considered for the above problem by the inventors of the present invention with reference to FIG. 10. FIG. 10 shows a state where a first metallic member 900 made of carbon steel and a second metallic member 901 made of an aluminum alloy (Al alloy) are bonded using the bonding method as described above. As shown in FIG. 10, in the bonding method, a tapered surface 900a of the first metallic member 900 is pressed (arrow $A_{90}$) against a tapered surface 901b of the second metallic member 901 and plastically fluidized, resulting in solid-phase bonding due to formation of a diffusion layer 902.

However, because a melting temperature of the second metallic member 901 made of an Al alloy is lower than that of carbon steel, the Al alloy at an initial stage of bonding melts to become a burr 903 to be outwardly discharged. This generates an unbonded portion $Ar_0$. Additionally, because of a difference in proof stress between an Al alloy and carbon steel, the second metallic member 901 is deformed. Under these circumstances, the conventional art requires a large amount of upset for ensuring a bonding strength.

SUMMARY OF INVENTION

The present invention has been made in view of solving the problems as described above, and an object thereof is to provide a metallic member bonding device allowed to suppress an increase in an amount of upset while ensuring a high bonding strength, and a bonding method therefor.

A metallic member bonding device according to one aspect of the present invention is a bonding device for pressing a first metallic member having a rod shape or a cylindrical shape into a hole portion of a second metallic member having an annular shape to bond the first metallic member and the second metallic member.

The first metallic member, which is one of the members to be bonded, is made of a first metallic material.

The second metallic member, which is the other member to be bonded, is made of a second metallic material different from the first metallic material and has the hole portion with a cross section smaller in size than a cross section of the first metallic member.

Then, the metallic member bonding device according to the present aspect includes a pressurizing unit, a current supply unit, and a deformation suppressing unit.

The pressurizing unit pressurizes the first metallic member toward the hole portion of the second metallic member to press the first metallic member therein.

The current supply unit supplies a welding current between the first metallic member and the second metallic member.

The deformation suppressing unit suppresses deformation of one of the first metallic member and the second metallic member, the one member having a constituent metallic material with at least one of a proof stress and a melting temperature lower than that of the other member, the deformation being in a direction of the cross section crossing a direction of the press-in.

Here, the deformation suppressing unit is provided in a region covering at least a plastic flow range in the press-in direction.

In the metallic member bonding device according to the present aspect, the deformation suppressing unit is provided which suppresses deformation, in the cross section direction, of a member having a constituent metallic material with at least one of a proof stress and a melting temperature lower than that of the other member. Therefore, it is possible to suppress deformation of the member with the lower value after pressing the first metallic member into the hole portion of the second metallic member by the pressurizing unit and starting a current flow.

Additionally, because the deformation suppressing unit is provided in a region covering the plastic flow range, generation and outward discharge of burrs can be effectively suppressed in the region.

Accordingly, at the time of bonding different kinds of metallic members (the first metallic member and the second metallic member) whose constituent metallic materials each have at least one of a proof stress and a melting temperature different from each other, the metallic member bonding device according to the present aspect enables suppression of an increase in an amount of upset while ensuring a high bonding strength.

DESCRIPTION OF EMBODIMENTS

In the following, embodiments of the present invention will be described with reference to the drawings. Embodiments to be described in the following are according to one aspect of the present invention only, and the present invention is not limited by embodiments set forth below except for substantive configuration thereof.

First Embodiment

1. Configuration of Metallic Member Bonding Device 1

A configuration of a metallic member bonding device 1 according to a first embodiment will be described with reference to FIG. 1.

Figure 1:
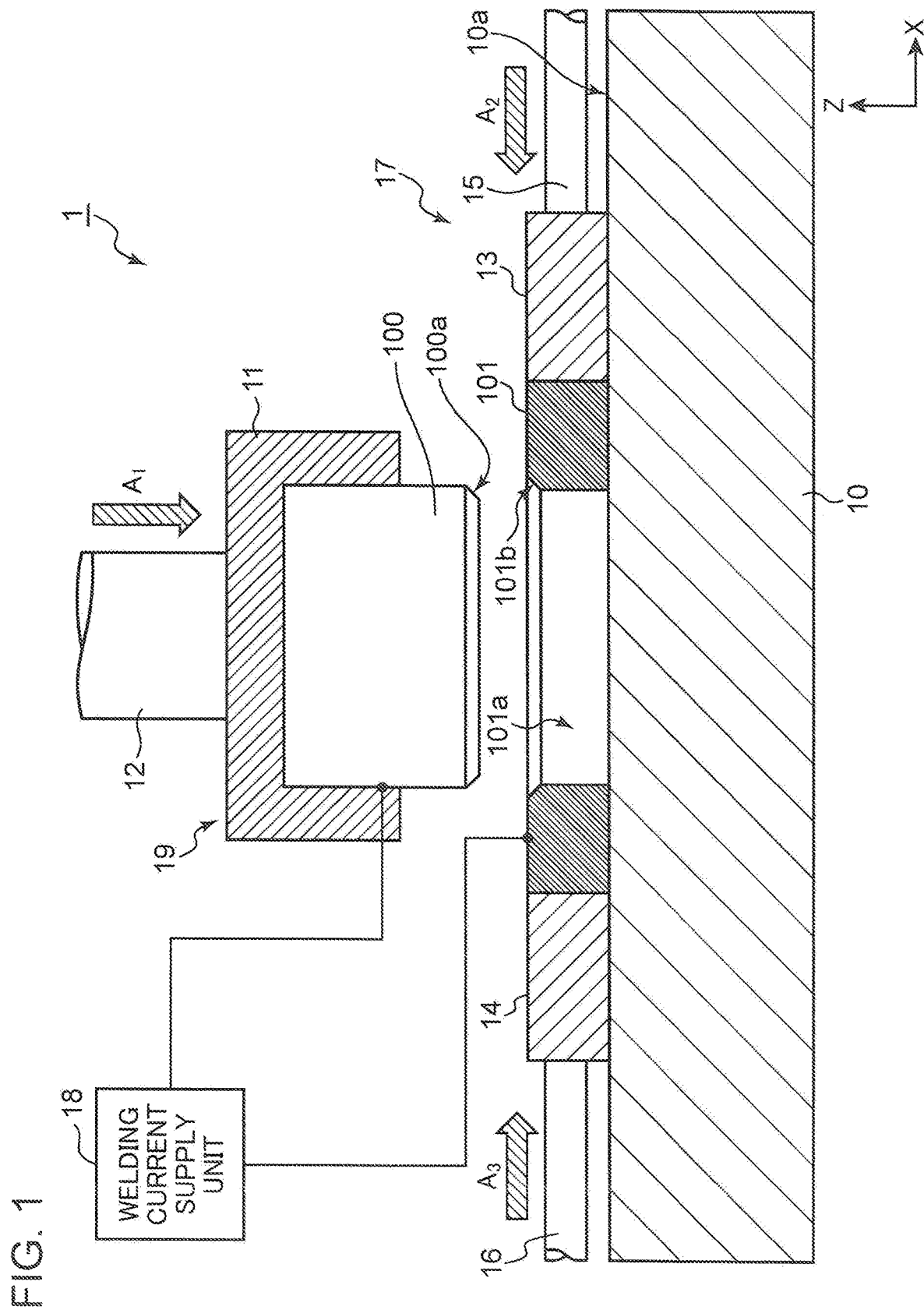
FIG. 1 is a schematic sectional view showing a configuration of a metallic member bonding device according to a first embodiment.

As shown in FIG. 1, the metallic member bonding device 1 according to the present embodiment includes a base 10, a pressurizing unit 19, a deformation suppressing unit 17, and a welding current supply unit 18. The base 10 is trapezoidal. A second metallic member 101 is placed on an upper surface 10a of the base 10. The pressurizing unit 19 has a welding head 11, a pressurizing rod 12, and a pressurizing mechanism (not illustrated).

The welding head 11 is bonded to the pressurizing rod 12 and can be lowered in a Z-axis direction as indicated by an arrow $A_1$. A first metallic member 100 is held by the welding head 11. Here, the device can be also configured such that, with the first metallic member 100 set to be placed on the second metallic member 101, the welding head 11 can be lowered to pressurize the first metallic member 100.

Although not illustrated, the pressurizing rod 12 is coupled to the pressurizing mechanism so as to be raised and lowered in the Z-axis direction in conjunction with a drive of the pressurizing mechanism. Specific examples of the pressurizing mechanism include a pneumatic cylinder, a hydraulic cylinder, an electric motor, and the like.

The deformation suppressing unit 17 has a pair of deformation suppressing heads 13 and 14, pressing rods 15 and 16 bonded to the respective deformation suppressing heads 13 and 14, and a pressing mechanism (not illustrated). The deformation suppressing heads 13 and 14 are disposed so as to surround an outer circumferential portion of the second metallic member 101 placed on the upper surface 10a of the base 10. The outer circumferential portion of the second metallic member 101 and inner circumferential portions of the deformation suppressing heads 13 and 14 are closely in contact with each other approximately without a gap.

The deformation suppressing heads 13 and 14 are configured to press the outer circumferential portion of the second metallic member 101 inwardly in a cross section direction as indicated by arrows $A_2$ and $A_3$ upon receiving a pressing force via the pressing rods 15 and 16. Although not illustrated, the pressing rods 15 and 16 are coupled to the pressing mechanism so as to move forward and backward in an X direction in conjunction with a drive of the pressing mechanism. Specific examples of the pressing mechanism include a pneumatic cylinder, a hydraulic cylinder, an electric motor, and the like.

In the above, the "cross section direction" represents a direction orthogonal to a press-in direction of the first metallic member 100 into a hole portion 101a of the second metallic member 101 (a plane direction orthogonal to the Z direction). In the present disclosure, this is also the case with other parts.

Here, pressing by the deformation suppressing heads 13 and 14 is conducted in synchronization with pressurization of the welding head 11. More specifically, at timing (in synchronization with) when a front end of the first metallic member 100 starts to be pressed into the hole portion 101a of the second metallic member 101 after the welding head 11 is lowered as indicated by the arrow $A_1$, the deformation suppressing heads 13 and 14 start pressing the outer circumferential portion of the second metallic member 101 as indicated by the arrows $A_2$ and $A_3$.

A pressing force and a pressing stroke of the deformation suppressing heads 13 and 14 are controlled such that the outer circumferential portion of the second metallic member 101 is not reduced in diameter by a predetermined amount or more.

The welding current supply unit 18 supplies a large current between the first metallic member 100 and the second metallic member 101 in a short period of time. Although FIG. 1 illustrates that wiring is connected directly from the welding current supply unit 18 to the first metallic member 100 and the second metallic member 101, a wiring mode in practice is not limited thereto. For example, the base 10 and the welding head 11 may be formed of a conductive material so that a current is supplied from the welding current supply unit 18 via the base 10 and the welding head 11.

Specifically, as the welding current supply unit 18, a large current supply device can be adopted which includes an electrolytic condenser, a weld transformer, a discharge circuit, and a large current circuit. The welding current supply unit 18 is a device which once charges the electrolytic condenser with electric energy required for welding and discharges the electric energy to the transformer in a short period of time, thereby supplying a large current between the first metallic member 100 and the second metallic member 101 in a short period of time.

2. First Metallic Member 100 and Second Metallic Member 101 to be Bonded

Subsequently, description will be made of the first metallic member 100 and the second metallic member 101 to be bonded with reference to FIG. 1.

As shown in FIG. 1, the first metallic member 100 has a solid rod shape. Then, the first metallic member 100 is disposed so as to have an axis thereof along the Z direction.

A lower end of the first metallic member 100 in the Z direction, i.e., an outer circumferential surface of a front end side to be pressed into the hole portion 101a of the second metallic member 101, is a tapered portion 100a.

Additionally, the first metallic member 100 has a cross section diameter larger than a hole diameter of the hole portion 101a of the second metallic member 101.

A constituent metallic material of the first metallic member 100 is a metallic material containing iron (Fe), specifically, made of carbon steel. In the present embodiment, S35C is adopted as one example. A yield point (proof stress) of S35C is not less than 305 (N/mm$^2$) and a melting temperature is 1538 (° C.). Additionally, a linear expansion coefficient is 11.7 ($\times 10^{-6}$/° C.).

On the other hand, the second metallic member 101, which is annular, has the hole portion 101a with a diameter smaller than the cross section diameter of the first metallic member 100. In the second metallic member 101, a press-in side rim of the hole portion 101a is a tapered portion 101b. A taper angle of the tapered portion 101b is approximately the same as a taper angle of the tapered portion 100a of the first metallic member 100.

The second metallic member 101 is a metallic material containing aluminum (Al), specifically, made of an aluminum alloy. In the present embodiment, as one example, A5056 (H34) which is an Al—Mg-based aluminum alloy is adopted. A yield point (proof stress) of A5056 (H34) is 230 (N/mm$^2$) and a melting temperature is 568 to 638 (° C.). Additionally, a linear expansion coefficient is 26.3 ($\times 10^{-6}$/° C.).

3. Configuration of Deformation Suppressing Unit 17

Figure 2:
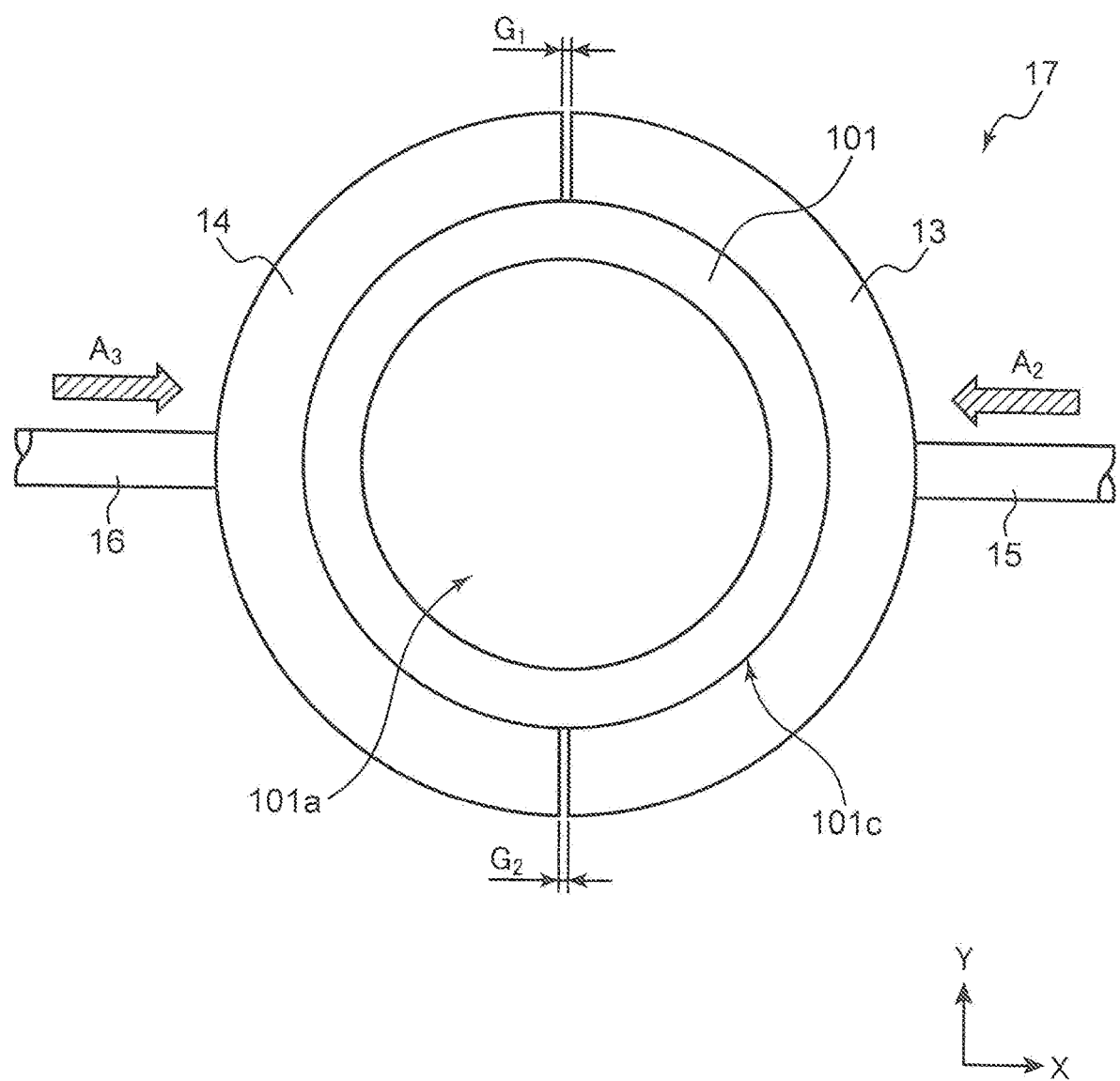
FIG. 2 is a schematic plan view showing a configuration of a deformation suppressing unit in the metallic member bonding device.

Supplementary description will be made of a configuration of the deformation suppressing unit 17 provided in the metallic member bonding device 1 according to the present embodiment with reference to FIG. 2. FIG. 2 is a schematic plan view showing the deformation suppressing unit 17 in a plan view seen from above in the Z direction in FIG. 1.

As shown in FIG. 2, the deformation suppressing heads 13 and 14 in the deformation suppressing unit 17 each have a semi-annular shape. The deformation suppressing head 13 and the deformation suppressing head 14 are disposed so as to have end sides thereof opposed to each other.

The second metallic member 101 with the hole portion 101a has an outer circumferential portion 101c along which the inner circumferential surfaces of the deformation suppressing heads 13 and 14 are provided approximately without a gap. Between the deformation suppressing heads 13 and 14, which are in contact with the outer circumferential portion 101c of the second metallic member 101, gaps $G_1$ and $G_2$ are provided. The gaps $G_1$ and $G_2$ are minute gaps.

Here, the reason for providing the gaps $G_1$ and $G_2$ between the deformation suppressing heads 13 and 14 in contact with the outer circumferential portion 101c of the second metallic member 101 is to suppress deformation of the second metallic member 101 even with a dimensional tolerance of the second metallic member 101 or dimensional tolerances of the deformation suppressing heads 13 and 14.

4. Bonding of First Metallic Member 100 and Second Metallic Member 101 Using Metallic Member Bonding Device 1

Bonding of the first metallic member 100 and the second metallic member 101 using the metallic member bonding device 1 configured as above is conducted in the following manner.

(i) The first metallic member 100 is prepared and set to the welding head 11. As shown in FIG. 1, in setting the first metallic member 100 to the welding head 11, the first metallic member 100 is set such that, at a front end outer periphery thereof, the tapered portion 100a faces the base 10 side.

(ii) The second metallic member 101 is prepared and placed on the upper surface 10a of the base 10. At this time, the second metallic member 101 is placed such that the side on which the tapered portion 101b is provided at the press-in side rim faces the welding head 11 side. Additionally, positional adjustment is conducted such that the center of the hole of the hole portion 101a in the second metallic member 101 coincides with an axis of the first metallic member 100 set to the welding head 11.

(iii) The deformation suppressing heads 13 and 14 of the deformation suppressing unit 17 are set to the outer circumferential portion 101c of the second metallic member 101. At this stage, it is assumed that the deformation suppressing heads 13 and 14 are simply set to the outer circumferential portion 101c of the second metallic member 101 so as not to have a gap, and no pressing force is applied inwardly in a radial direction.

(iv) The welding head 11 is lowered as indicated by the arrow $A_1$.

(v) At a time point when the front end of the first metallic member 100 and an opening edge facing the hole portion 101a of the second metallic member 101 come into contact with or come close to each other, current supply is started from the welding current supply unit 18.

(vi) At a time point when the front end of the first metallic member 100 starts to be pressed into the hole portion 101a of the second metallic member 101, along with the above current supply, the deformation suppressing heads 13 and 14 are pressed inwardly in the radial direction of the second metallic member 101 as indicated by the arrows $A_2$ and $A_3$. In other words, in synchronization with pressing of the first metallic member 100 into the hole portion 101a of the second metallic member 101, a fastening load is applied inwardly in the radial direction of the second metallic member 101.

(vii) The first metallic member 100 is pressed in by a prescribed amount of upset to end the bonding. Then, simultaneously with the completion of the bonding, or a little later, deformation suppressing operation by the deformation suppressing unit 17 ends.

5. Function Performed by Deformation Suppressing Unit 17

Figure 3:
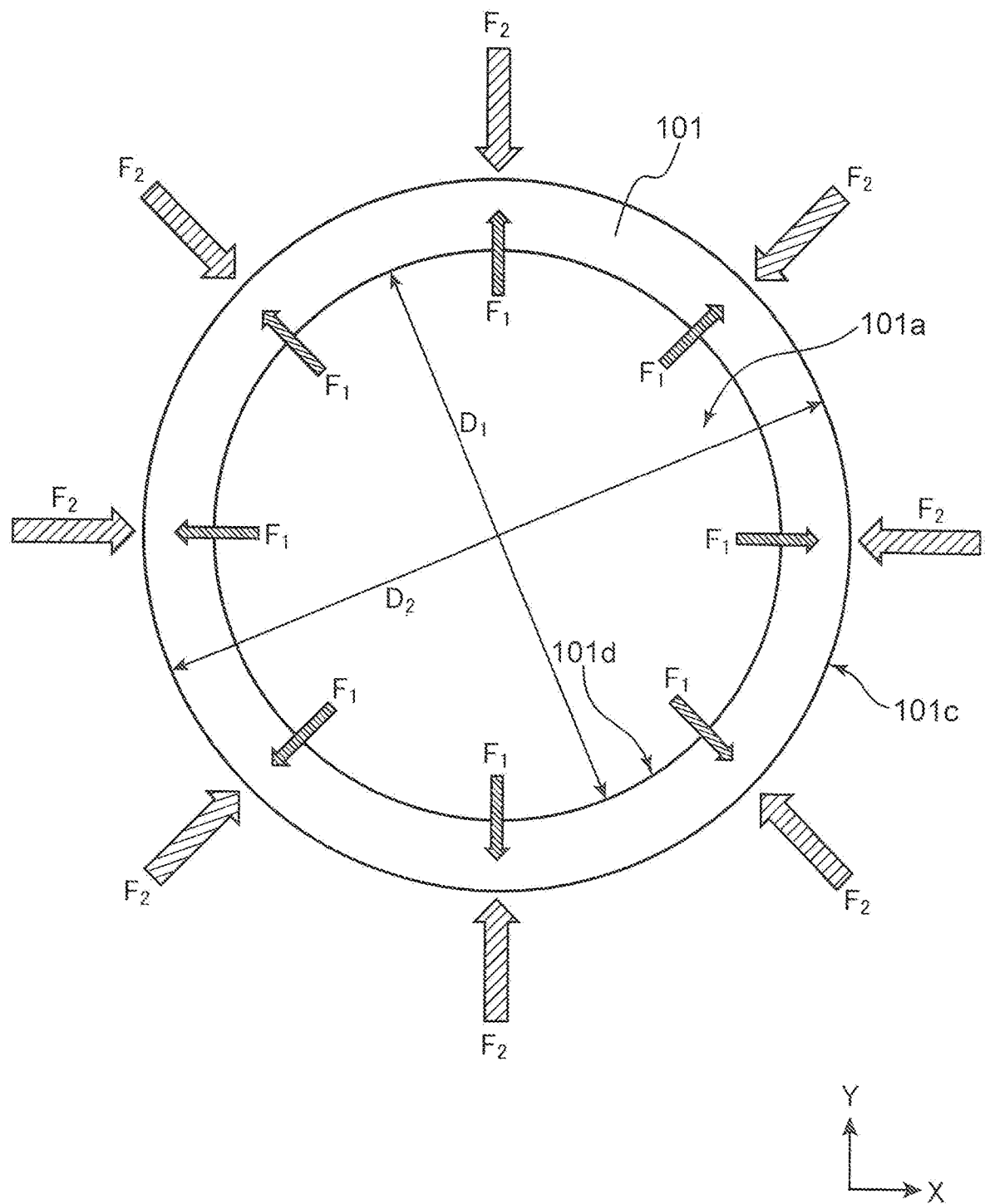
FIG. 3 is a schematic view for explaining a function performed by the deformation suppressing unit.
Figure 4:
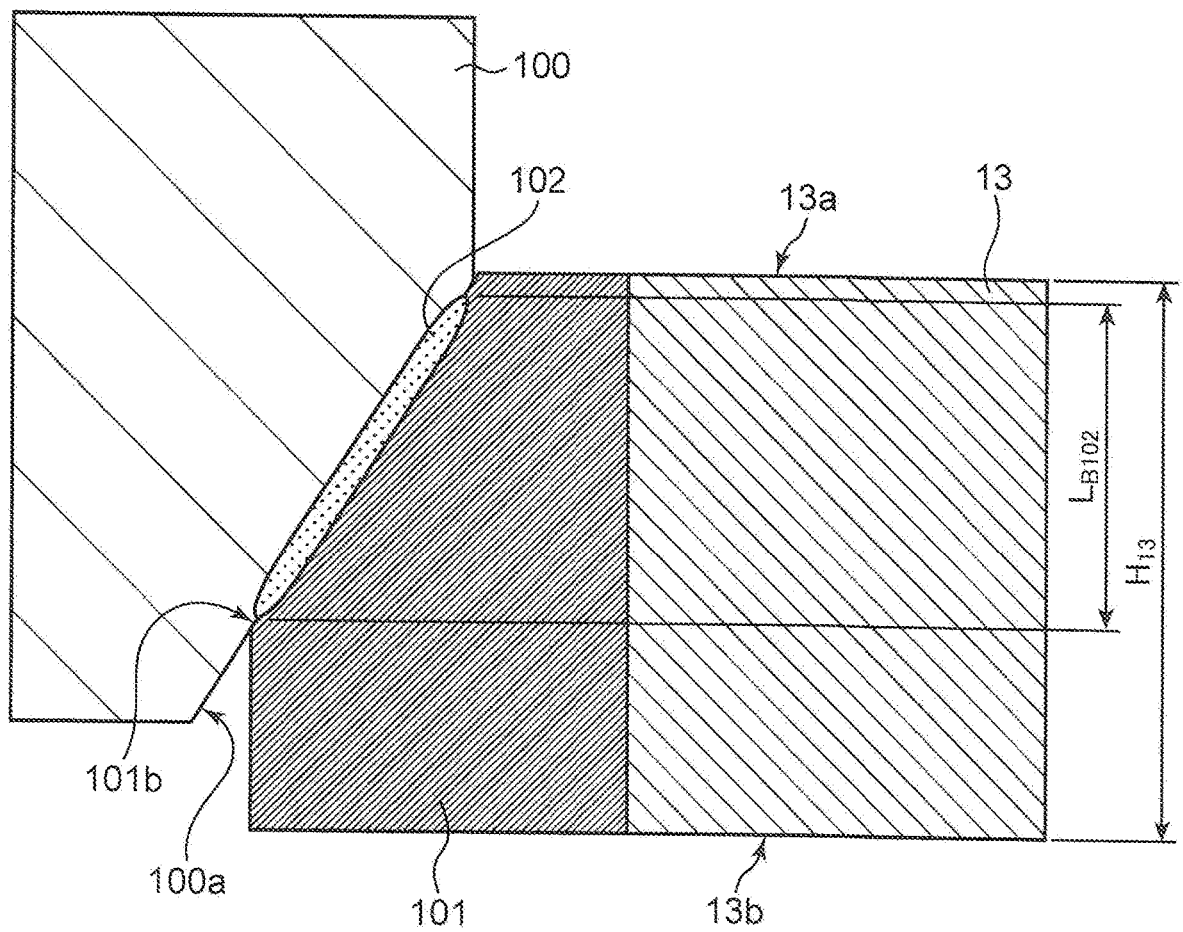
FIG. 4 is a schematic sectional view showing a first metallic member and a second metallic member bonded by using the metallic member bonding device.

Description will be made of a function performed by the deformation suppressing unit 17 in the metallic member bonding device 1 with reference to FIG. 3 and FIG. 4. FIG. 3 is a schematic view schematically showing an appearance of the second metallic member 101 in a state where the first metallic member 100 is pressed in and a welding current is supplied. FIG. 4 is a schematic sectional view showing the first metallic member 100 and the second metallic member 101 being bonded by using the metallic member bonding device 1.

As described above, the second metallic member 101 is made of an aluminum alloy, and thus has both a proof stress and a melting temperature lower than those of carbon steel forming the first metallic member 100. Thus, as shown in FIG. 3, a force $F_1$ is exerted on the second metallic member 101 to deform the second metallic member 101 outwardly in the radial direction. This invites an extension of circumferential lengths of an inner circumferential portion 101$d$ and the outer circumferential portion 101$c$ of the second metallic member 101.

However, in the present embodiment, with the deformation suppressing heads 13 and 14 of the deformation suppressing unit 17 in contact with the outer circumferential portion 101$c$, the second metallic member 101 is applied a force $F_2$ inwardly in the radial direction in synchronization with engagement. Accordingly, in the second metallic member 101, an outer diameter $D_2$ barely changes and an inner diameter $D_1$ also substantially barely changes except for a change due to plastic flow.

Figure 10:
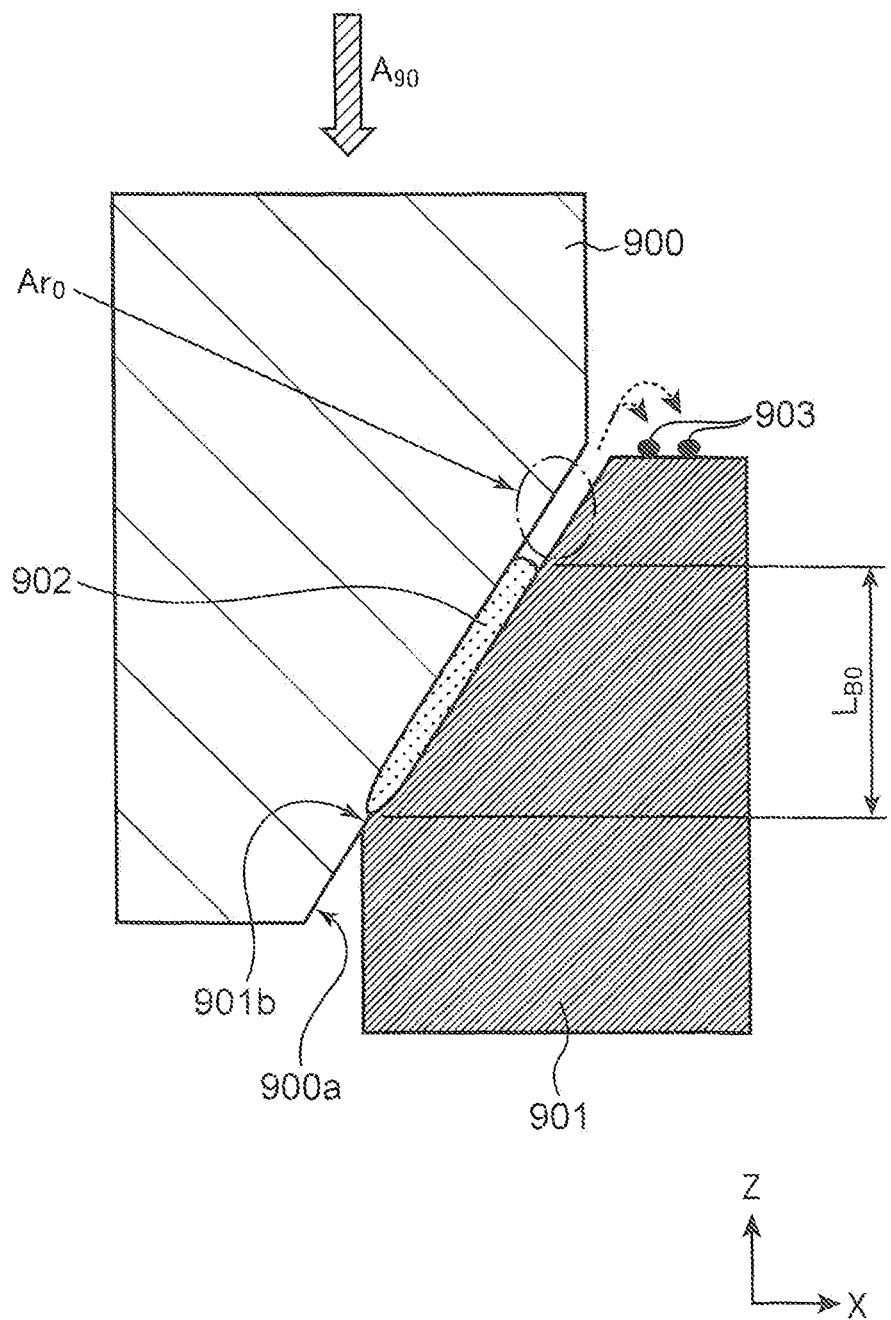
FIG. 10 is a schematic sectional view showing a first metallic member and a second metallic member bonded by using a metallic member bonding device according to the conventional art.

As described in the foregoing, in the first metallic member 100 and the second metallic member 101 bonded using the metallic member bonding device 1 provided with the deformation suppressing unit 17, burr generation and discharge are suppressed as shown in FIG. 4 and generation of such an "unbonded portion" as shown in FIG. 10 is also suppressed. Thus, in bonding using the metallic member bonding device 1 according to the present embodiment, a bonding portion (a diffusion layer 102) with a long bonding length $L_{B102}$ can be formed while suppressing an increase in an amount of upset.

Accordingly, in the bonding using the metallic member bonding device 1 according to the present embodiment, the first metallic member 100 and the second metallic member 101 can be bonded with a high bonding strength while suppressing an increase in an amount of upset.

As shown in FIG. 4, in the metallic member bonding device 1 according to the present embodiment, the deformation suppressing unit 17 has a height $H_{13}$ of the deformation suppressing heads 13 and 14 (in FIG. 4, only the deformation suppressing head 13 is illustrated) in the Z direction set to be equal to or larger than a height of the second metallic member 101 in the Z direction. In other words, a lower surface 13$b$ of the deformation suppressing head 13, 14 is set to make contact with the upper surface 10$a$ of the base 10, and an upper surface 13$a$ is set to be flush with an upper surface of the second metallic member 101 in the Z direction or located higher than the upper surface.

By setting a size and arrangement of the deformation suppressing heads 13 and 14 in a manner as described above, a fastening load can be applied to the second metallic member 101 within a range covering a range of plastic flow at the time of bonding (approximately the same range where the diffusion layer 102 is formed) in the Z direction. This enables deformation of the second metallic member 101 to be reliably suppressed in a direction to increase the radius within a range where plastic flow occurs at the time of bonding, so that generation and outward discharge of burrs are suppressed.

6. Effect

The metallic member bonding device 1 is provided with the deformation suppressing unit 17 which suppresses deformation of the outer circumferential portion 101$c$ of the second metallic member 101 in a direction to increase the radius, the second metallic member 101 having a constituent material with both a proof stress and a melting temperature lower than those of the first metallic member 100. Therefore, it is possible to suppress deformation of the second metallic member 101 in the direction to increase the radius after pressing the first metallic member 100 into the hole portion 101$a$ of the second metallic member 101 and starting a current flow.

Additionally, since the deformation suppressing unit 17 is provided so as to press a region covering a plastic flow range, generation and outward discharge of burrs at the time of bonding can be effectively suppressed.

Accordingly, when bonding the first metallic member 100 made of carbon steel and the second metallic member 101 made of an aluminum alloy, the metallic member bonding device 1 according to the present embodiment enables an increase in an amount of upset to be suppressed while ensuring a high bonding strength.

Additionally, since the metallic member bonding device 1 applies a fastening load by the deformation suppressing unit 17 in synchronization with pressing of the first metallic member 100 into the hole portion 101$a$ by lowering of the welding head 11, a load for suppressing deformation can be applied at appropriate timing. It is therefore possible to efficiently suppress an increase in an amount of upset while ensuring a high bonding strength.

Additionally, the deformation suppressing unit 17 in the metallic member bonding device 1 has two deformation suppressing heads 13 and 14. This enables less non-uniform pressing and enables deformation of the second metallic member 101 in the cross section direction to be uniformly suppressed in a direction to increase the radius.

Second Embodiment

1. Configuration of Metallic Member Bonding Device 2

Figure 5:
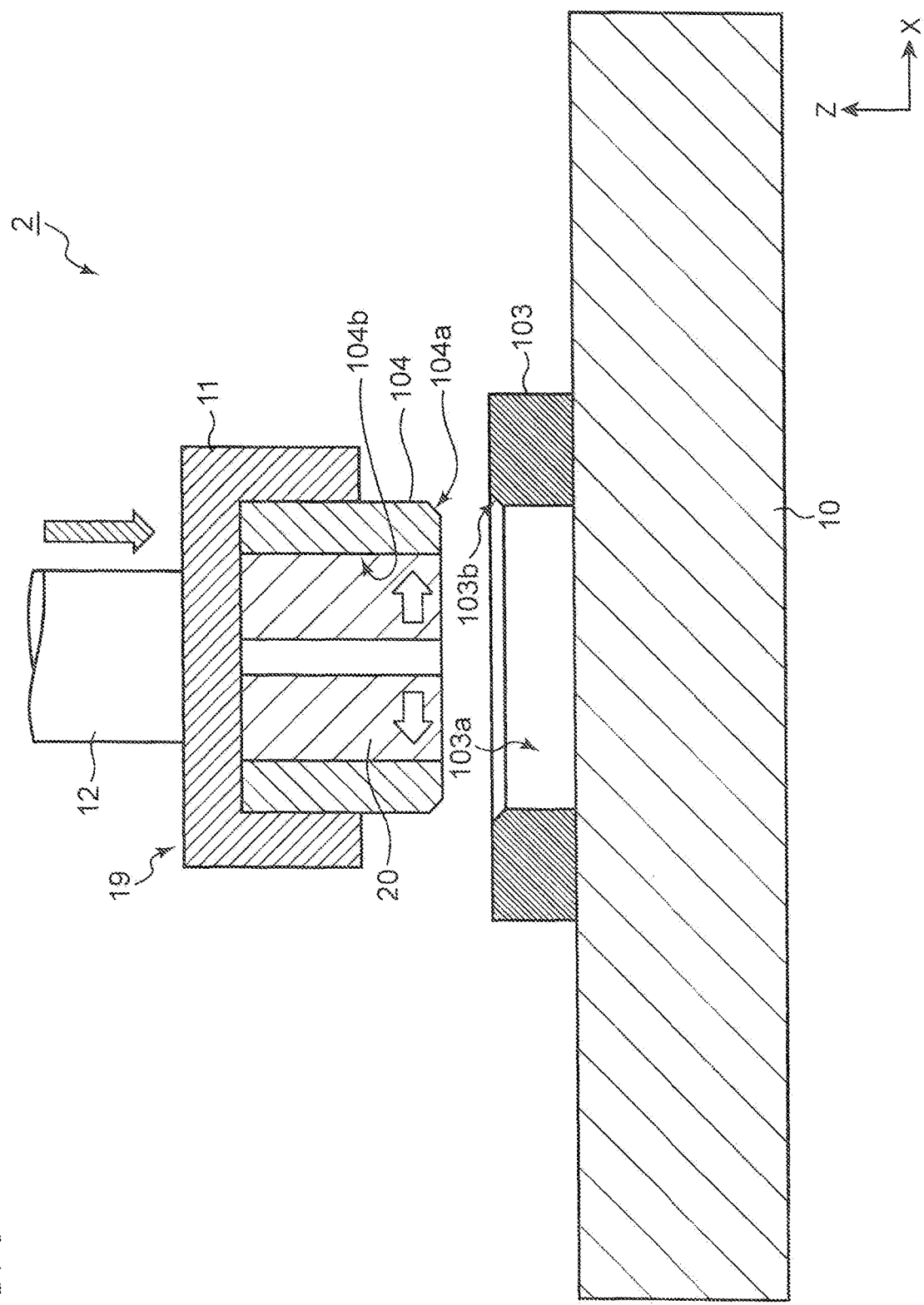
FIG. 5 is a schematic sectional view showing a configuration of a metallic member bonding device according to a second embodiment.

A configuration of a metallic member bonding device 2 according to a second embodiment will be described with reference to FIG. 5. FIG. 5 is a schematic sectional view showing the configuration of the metallic member bonding device 2, in which illustration of a part of the configuration is omitted. Additionally, in FIG. 5, the same reference numerals are assigned to parts with the same configurations as those of the metallic member bonding device 1 according to the first embodiment to omit detailed description thereof in the following.

As shown in FIG. 5, in the metallic member bonding device 2, a deformation suppressing unit 20 is provided within a tube of a tubular second metallic member 104. The deformation suppressing unit 20 is designed to apply a pressing force to an inner circumferential portion 104$b$ of the second metallic member 104 outwardly in a radial direction thereof.

A lower end of the second metallic member 104 in a Z direction, i.e., an outer circumferential surface of a front end side to be pressed into a hole portion 103$a$ of the first metallic member 103, is a tapered portion 104$a$, which arrangement is the same as the first metallic member 100 of the first embodiment.

On the other hand, in the metallic member bonding device 2 according to the present embodiment, no deformation suppressing unit is provided for applying a fastening load to an outer circumferential portion of the first metallic member 103. Although not illustrated, there is provided a positioning device for the first metallic member 103 to suppress a positional displacement on the base 10.

A press-in side rim of the hole portion 103a of the first metallic member 103 is a tapered portion 103b. A taper angle of the tapered portion 103b is approximately the same as a taper angle of the tapered portion 104a of the second metallic member 104. Additionally, a hole diameter of the hole portion 103a of the first metallic member 103 is a little larger than an outer diameter of the second metallic member 104.

2. Each Constituent Metallic Material of First Metallic Member 103 and Second Metallic Member 104

A constituent metallic material of the first metallic member 103 is a metallic material containing iron (Fe), specifically, made of carbon steel. Also in the present embodiment, S35C is adopted as one example similarly to the first embodiment. A yield point (proof stress) of S35C is not less than 305 (N/mm$^2$) and a melting temperature is 1538 (° C.). Additionally, a linear expansion coefficient is 11.7 ($\times 10^{-6}$/° C.).

On the other hand, a constituent metallic material of the second metallic member 104 is a metallic material containing aluminum (Al), specifically, made of an aluminum alloy. Also in the present embodiment, as one example, A5056 (H34) is adopted which is an Al—Mg-based aluminum alloy similarly to the first embodiment. A yield point (proof stress) of A5056 (H34) is 230 (N/mm$^2$) and a melting temperature is 568 to 638 (° C.). Additionally, a linear expansion coefficient is 26.3 ($\times 10^{-6}$/° C.).

3. Configuration of Deformation Suppressing Unit 20

Figure 6:
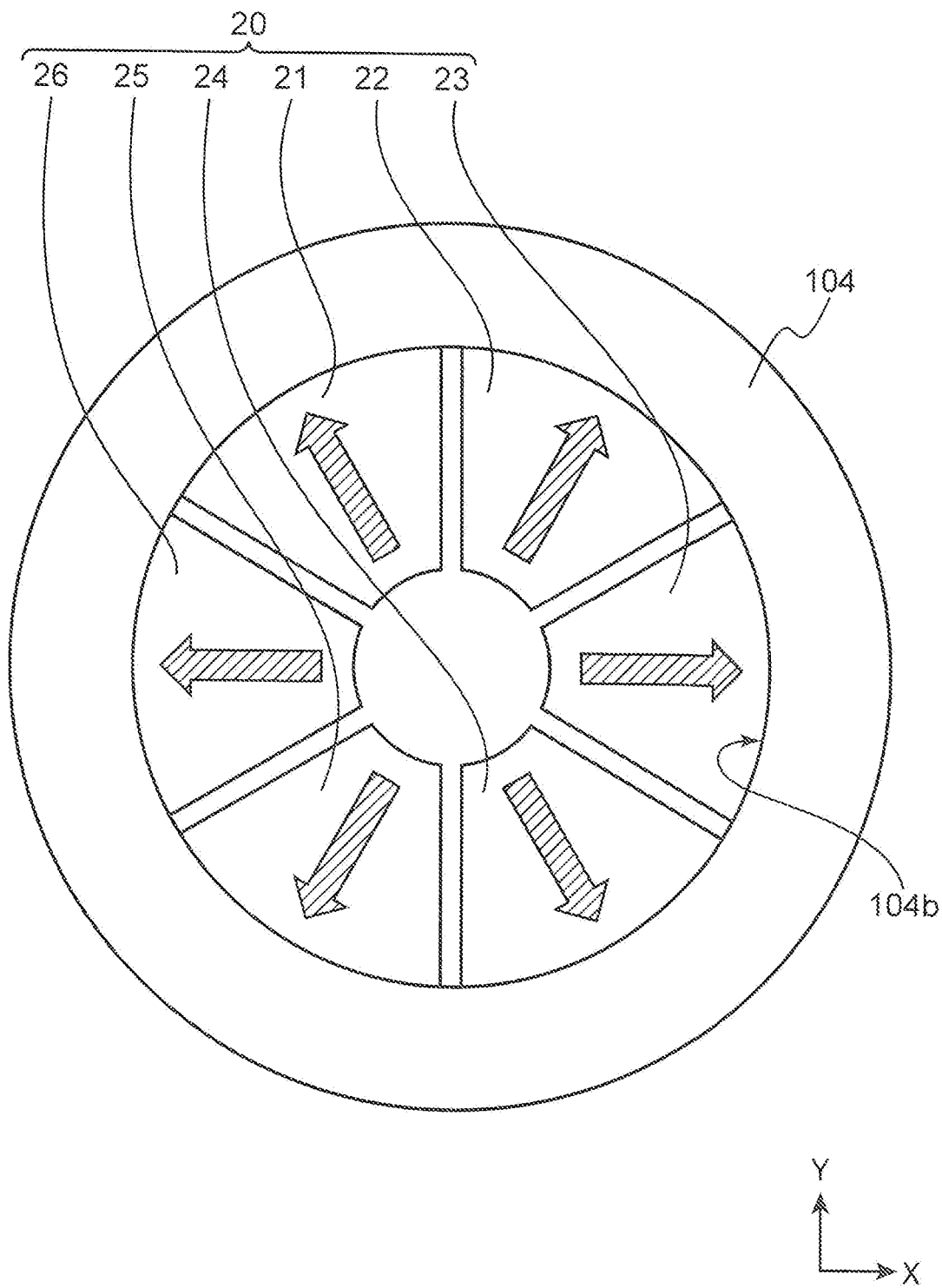
FIG. 6 is a schematic plan view showing a configuration of a deformation suppressing unit in the metallic member bonding device.

Supplementary description will be made of a configuration of the deformation suppressing unit 20 provided in the metallic member bonding device 2 according to the present embodiment with reference to FIG. 6. FIG. 6 is a schematic plan view showing the deformation suppressing unit 20 in a virtual plan view seen from above in the Z direction in FIG. 5.

As shown in FIG. 6, the deformation suppressing unit 20 has six deformation suppressing heads 21 to 26. Additionally, although not illustrated, the deformation suppressing unit 20 has a pressing mechanism for causing the respective deformation suppressing heads 21 to 26 to move forward and backward in the radial direction.

Each of the deformation suppressing heads 21 to 26 has a fan-shape obtained by dividing a circle into six. Each of the deformation suppressing heads 21 to 26 is designed such that each outer circumferential surface makes contact with the inner circumferential portion 104b of the second metallic member 104 approximately without a gap when expanding in the radial direction.

The deformation suppressing unit 20 provided in the metallic member bonding device 2 according to the present embodiment has the same mechanism as that of a so-called inside diameter gripping collet chuck.

Also during driving of the metallic member bonding device 2 according to the present embodiment, the deformation suppressing unit 20 applies a load to the inner circumferential portion 104b of the second metallic member 104 in a direction to increase the radius in synchronization with pressing of the second metallic member 104 into the hole portion 103a of the first metallic member 103 by lowering of the welding head 11 in the pressurizing unit 19.

4. State of Bonding Between First Metallic Member 103 and Second Metallic Member 104

Figure 7:
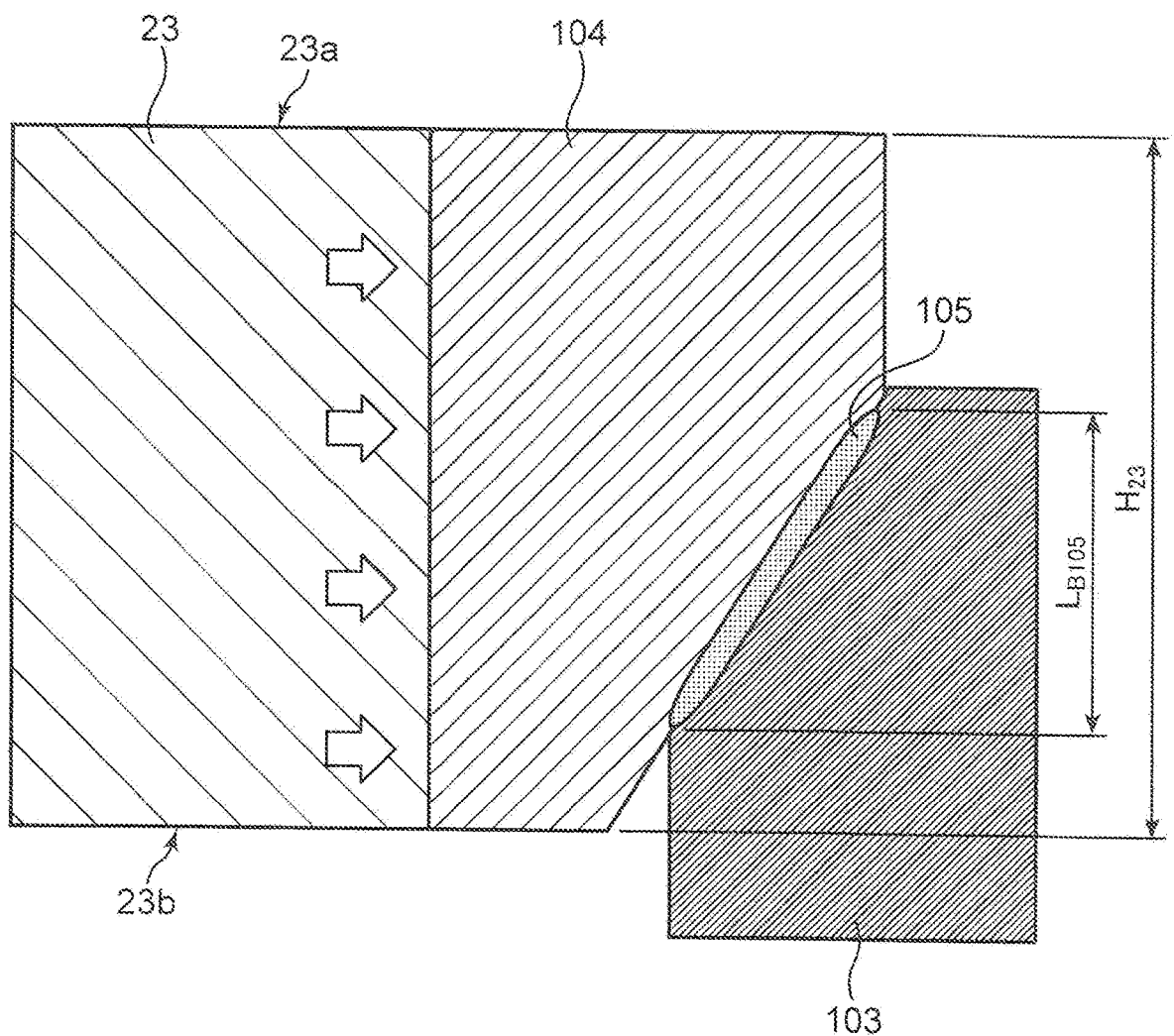
FIG. 7 is a schematic sectional view showing a first metallic member and a second metallic member bonded by using the metallic member bonding device.
Figure 7:

In the first metallic member 103 and the second metallic member 104 bonded using the metallic member bonding device 2 provided with the deformation suppressing unit 20, as shown in FIG. 7, generation and outward discharge of burrs are suppressed and generation of such an "unbonded portion" as shown in FIG. 10 is also suppressed. Thus, in bonding using the metallic member bonding device 2 according to the present embodiment, a bonding portion (a diffusion layer 105) with a long bonding length $L_{B105}$ can be formed while suppressing an increase in an amount of upset.

Accordingly, also in the bonding using the metallic member bonding device 2 according to the present embodiment, the first metallic member 103 and the second metallic member 104 can be bonded with a high bonding strength while suppressing an increase in an amount of upset.

As illustrated in FIG. 7, in the metallic member bonding device 2 according to the present embodiment, a height $H_{23}$ of the deformation suppressing heads 21 to 26 (in FIG. 7, only the deformation suppressing head 23 is illustrated) in the Z direction in the deformation suppressing unit 20 is set to cover a range of plastic flow (approximately the same range where the diffusion layer 105 is formed) at the time of bonding. In other words, a lower surface 23b of each of the deformation suppressing heads 21 to 26 is set to be approximately flush with the lower end surface of the second metallic member 104 in the Z direction, and an upper surface 23a is set to be above, in the Z direction, a planned region in which the diffusion layer 105 is to be formed.

By setting a size and arrangement of the deformation suppressing heads 21 to 26 in a manner as described above, a load can be applied to the second metallic member 104 outwardly in the radial direction within a range covering a range of plastic flow (approximately the same range where the diffusion layer 105 is formed) at the time of bonding in the Z direction. This enables deformation of the second metallic member 104 to be reliably suppressed in a direction to reduce the radius within a range where plastic flow occurs at the time of bonding, so that generation and outward discharge of burrs are suppressed.

5. Effect

The metallic member bonding device 2 is provided with the deformation suppressing unit 20 which suppresses deformation of the inner circumferential portion 104b of the second metallic member 104 in a direction to reduce the radius, the second metallic member 104 having a constituent material with both a proof stress and a melting temperature lower than those of the first metallic member 103. Therefore, it is possible to suppress deformation of the second metallic member 104 in the direction to reduce the radius after pressing the second metallic member 104 into the hole portion 103a of the first metallic member 103 and starting a current flow.

Additionally, since the deformation suppressing unit 20 is provided so as to press a region covering a plastic flow range, generation and outward discharge of burrs at the time of bonding can be effectively suppressed.

Accordingly, when bonding the first metallic member 103 made of carbon steel and the second metallic member 104 made of an aluminum alloy, the metallic member bonding device 2 according to the present embodiment also enables an increase in an amount of upset to be suppressed while ensuring a high bonding strength.

Additionally, since the metallic member bonding device 2 according to the present embodiment applies a load outwardly in the radial direction by the deformation suppressing unit 20 in synchronization with pressing of the second metallic member 104 into the hole portion 103a by lowering of the welding head 11 in the pressurizing unit 19, a load for suppressing deformation can be applied at appropriate timing. It is therefore possible to efficiently suppress an increase in an amount of upset while ensuring a high bonding strength.

Additionally, the deformation suppressing unit 20 in the metallic member bonding device 2 has the six deformation suppressing heads 21 to 26. This enables less non-uniform pressing and enables deformation of the second metallic member 104 in the cross section direction to be uniformly suppressed in a direction to reduce the radius.

Third Embodiment

Figure 8:
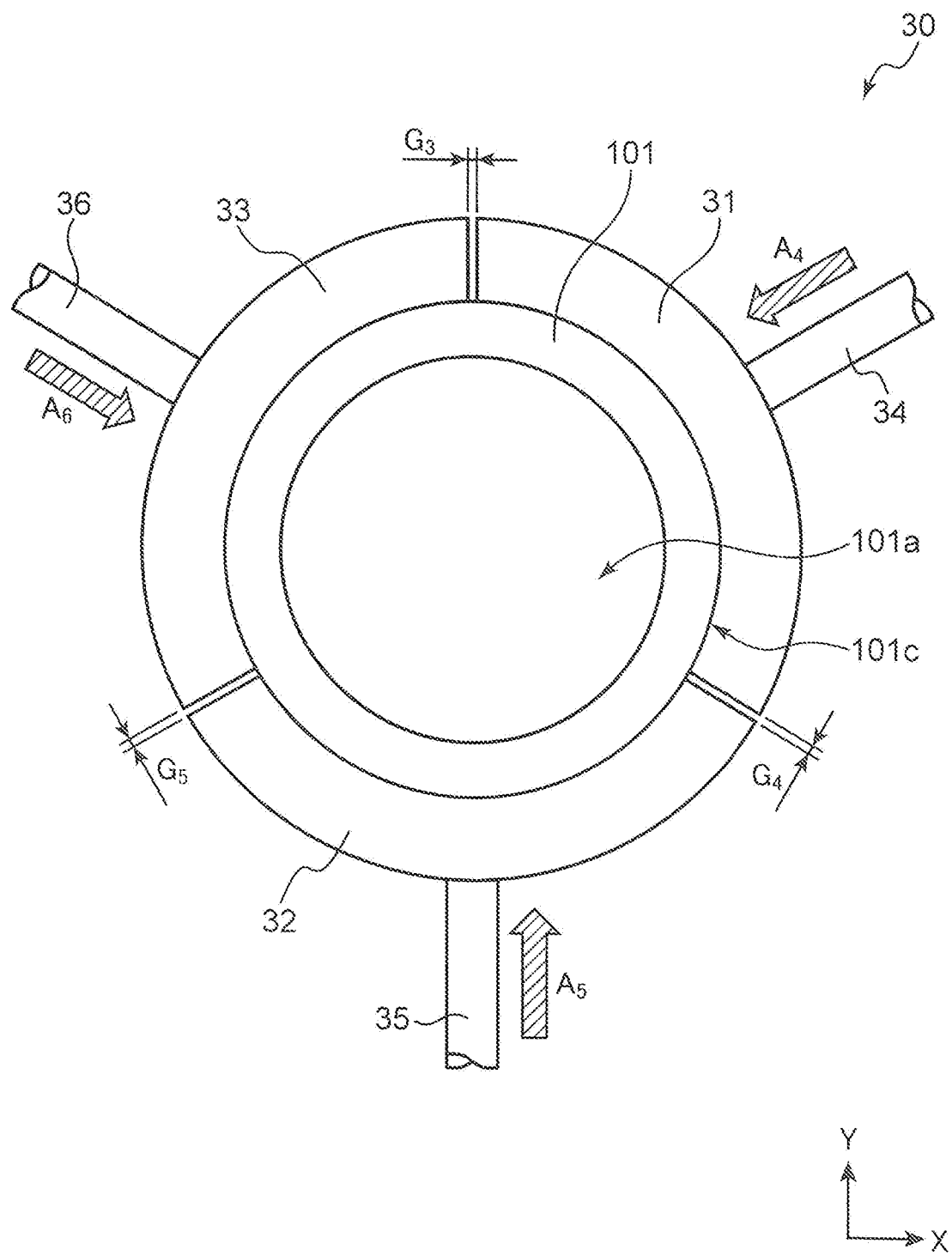
FIG. 8 is a schematic plan view showing a configuration of a deformation suppressing unit as extracted among configurations of a metallic member bonding device according to a third embodiment.

A configuration of a metallic member bonding device according to a third embodiment will be described with reference to FIG. 8. FIG. 8 shows a part of a configuration of a deformation suppressing unit 30 as extracted among configurations of the metallic member bonding device according to the present embodiment. Respective configurations whose illustration is omitted are the same as those of the metallic member bonding device 1 according to the first embodiment.

As shown in FIG. 8, the deformation suppressing unit 30 provided in the metallic member bonding device according to the present embodiment has three deformation suppressing heads 31 to 33, and pressing rods 34 to 36 connected to the respective deformation suppressing heads 31 to 33. Additionally, although not illustrated, the deformation suppressing unit 30 has a pressing mechanism connected to the pressing rods 34 to 36 to cause the respective deformation suppressing heads 31 to 33 to move forward or backward in a radial direction.

Each of the deformation suppressing heads 31 to 33 has a planar shape obtained by dividing a circle into three. The deformation suppressing heads 31 to 33 are disposed so as to have end sides thereof opposed to each other.

A second metallic member 101 with a hole portion 101a has an outer circumferential portion 101c along which inner circumferential surfaces of the deformation suppressing heads 31 to 33 fit approximately without a gap. The deformation suppressing heads 31 to 33 are configured so as to have gaps $G_3$, $G_4$, and $G_5$ therebetween in a state, as indicated by arrows $A_4$ to $A_6$, where the deformation suppressing heads 31 to 33 are moved forward inwardly in the radial direction so as to make contact with the outer circumferential portion 101c of the second metallic member 101. The gaps $G_3$, $G_4$, and $G_5$ are minute gaps.

Also in the present embodiment, provision of the gaps $G_3$, $G_4$, and $G_5$ allows deformation of the second metallic member 101 to be suppressed even with a dimensional tolerance of the second metallic member 101 or dimensional tolerances of the deformation suppressing heads 31 to 33 similarly to the above.

Also in the metallic member bonding device having the deformation suppressing unit 30 configured as above, the same effect as that of the metallic member bonding device 1 according to the first embodiment can be obtained.

Fourth Embodiment

Figure 9:
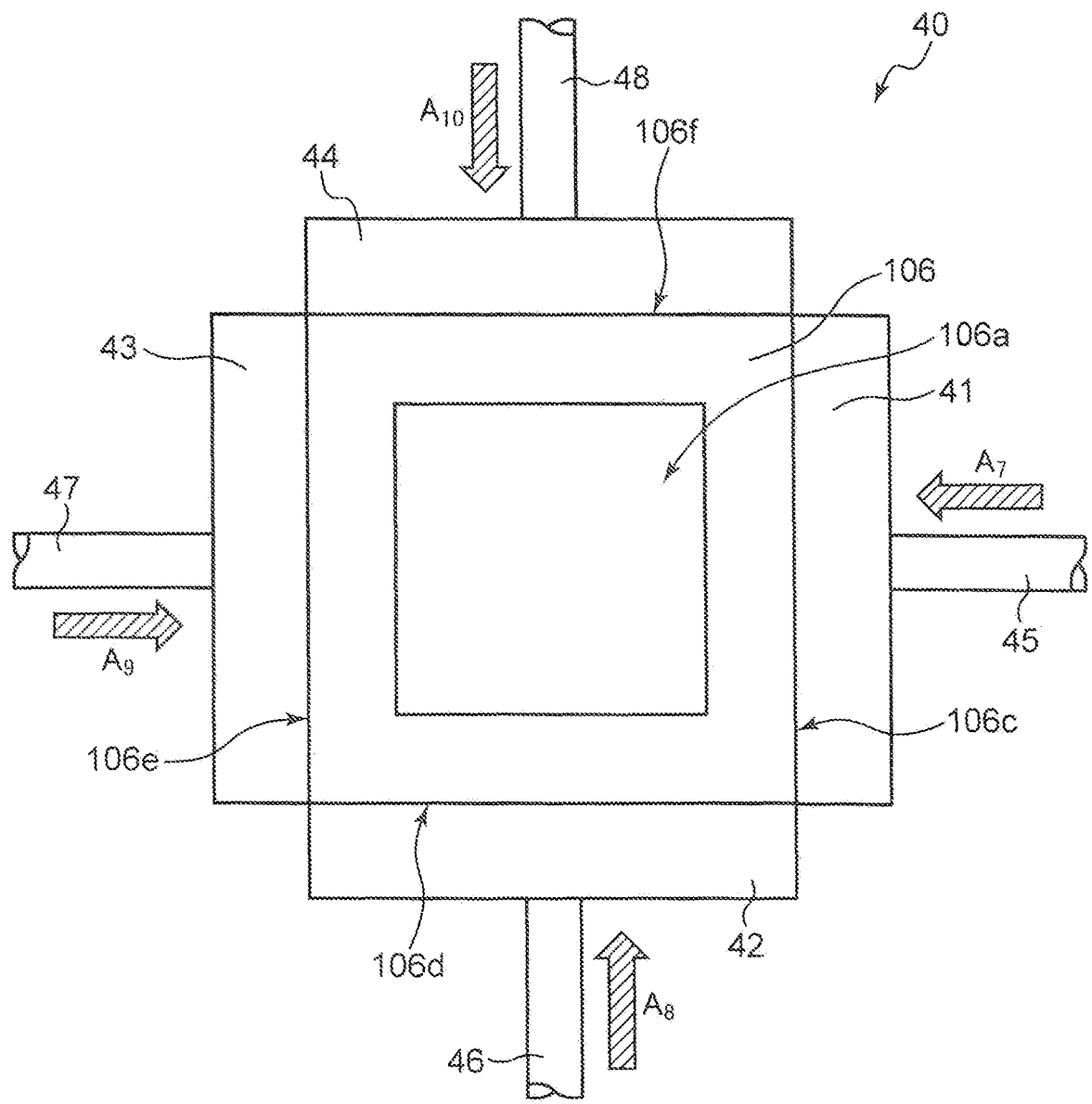
FIG. 9 is a schematic plan view showing a configuration of a deformation suppressing unit as extracted among configurations of a metallic member bonding device according to a fourth embodiment.

A configuration of a metallic member bonding device according to a fourth embodiment will be described with reference to FIG. 9. FIG. 9 shows a part of a configuration of a deformation suppressing unit 40 as extracted among configurations of the metallic member bonding device according to the present embodiment.

First, while in the first to third embodiments, a member having a round or annular cross section is adopted as a member to be bonded, in the present embodiment, a second metallic member 106 having a square annular cross section is one of the members to be bonded as shown in FIG. 9.

Although not illustrated, the other member to be bonded is a rod-shaped or cylindrical metallic member having a square cross section corresponding to a shape of a hole portion 106a in the second metallic member 106.

As shown in FIG. 9, the deformation suppressing unit 40 of the metallic member bonding device according to the present embodiment includes four deformation suppressing heads 41 to 44 and four pressing heads 45 to 48. The four deformation suppressing heads 41 to 44 are configured to be able to make contact with four outer circumferential portions 106c to 106f in the second metallic member 106 each without a gap. Although not illustrated, the four pressing heads 45 to 48 are connected to a pressing mechanism, and are capable of inwardly applying a fastening load to the second metallic member 106 as indicated by arrows $A_7$ to $A_{10}$ in synchronization with pressing of the first metallic member into the hole portion 106a by a pressurizing unit 19.

Also in the metallic member bonding device having the deformation suppressing unit 40 configured as above, the same effect as that of the metallic member bonding device 1 according to the first embodiment can be obtained.

Modification

Although in the first to fourth embodiments, a member made of a material containing Al (an Al alloy) and a member made of a material containing Fe (carbon steel) are adopted as the members to be bonded, the present invention is not limited thereto. In the present invention, the effect can be obtained by providing such a deformation suppressing unit as described above for bonding between members made of materials each having at least one of a proof stress and a melting temperature different from each other.

The present invention is also applicable, for example, to bonding between a member made of a material containing magnesium (Mg) (e.g., a Mg alloy) and a member made of a material containing Al (e.g., an Al alloy), and to bonding between a member made of a material containing Mg (e.g., a Mg alloy) and a member made of a material containing Fe (e.g., carbon steel). Also in these cases, a deformation suppressing unit can be provided in consideration of at least either one of a proof stress and a melting temperature of a material forming the member.

When an MDC1D is used as a Mg alloy, for example, a yield point (proof stress) is 160 (N/mm$^2$) and a melting temperature is 470 to 595 (° C.). Additionally, a linear expansion coefficient is 27.0 ($\times 10^{-6}$/° C.). A relation can be taken into consideration between these physical properties and a material forming a member as a bonding target.

In the second embodiment, the deformation suppressing unit 20 is provided for the second metallic member 104 so as to suppress the second metallic member 104 from having a reduced diameter at the time of bonding with the first metallic member 103. In the present invention, for example, a deformation suppressing unit may be further provided for the first metallic member 103 in the second embodiment. This is because when a welding current is passed, temperatures of the members 103 and 104 are increased and the members 103 and 104 tend to expand. In this case, the diameter of the first metallic member 103 made of carbon steel and having an annular shape is likely to be increased. Suppressing the increase in diameter will be effective in suppressing generation and outward discharge of burrs. For a metallic member to be bonded, even when a constituent material thereof is other than those described above, a deformation suppressing unit that obtains the same effect can be configured by taking into consideration a linear expansion coefficient together with a proof stress and a melting temperature of a constituent material of each member.

While in the first to fourth embodiments, one example is shown as a shape of the members 100, 101, 103, 104, and 106 to be bonded, the present invention is not limited thereto. For example, an elongate annular member or a member having an outer circumference of a triangle, or a polygon more than a pentagon in a plan view can be a member to be bonded. In this case, the same effect as described above can be obtained by providing a deformation suppressing head corresponding to a shape of each of the outer circumferential portions.

In the first to fourth embodiments, it is assumed that deformation of the second metallic members 101, 104, and 106 is suppressed by providing the deformation suppressing units 17, 20, 30, and 40. The deformation suppressing units 17, 20, 30, and 40 in these embodiments are assumed to have a function of suppressing deformation of the second metallic members 101, 104, and 106 in a direction of a cross section.

However, the present invention is not limited thereto. For example, in a state where a welding current is passed and a metallic member having a lower melting temperature is partly softened, the softened metallic member may be deformed in the cross section direction toward the other metallic member to be bonded. Such a configuration has an advantage in suppressing a reduction in density of a plastically fluidized region in the cross section direction, thereby ensuring a high bonding strength.

Although in the first, third, and fourth embodiments, a fastening load is applied to the outer circumferential portions 101c, 106c, 106d, 106e, and 106f of the second metallic members 101 and 106, the present invention is not limited thereto. For example, an upper surface of an outer edge portion of the second metallic member 101 in the Z direction shown in FIG. 1 may be pressed against the base 10 to suppress deformation of the second metallic member 101 in the radial direction by a frictional force.

Although the second metallic member 101 is placed on the upper surface 10a of the base 10 in the first embodiment and the first metallic member 103 is placed on the same in the second embodiment, the present invention is not limited thereto. For example, a second welding head may be provided opposed to the welding head 11 to grip the second metallic member 101 and the first metallic member 103, so as to rise upwardly in the Z direction at the time of welding.

While in the first to third embodiments, the deformation suppressing heads 13 and 14, 21 to 26, and 31 to 33 are configured to be able to move forward or backward only in the radial direction, the present invention is not limited thereto. For example, the respective deformation suppressing heads can be configured to spirally rotate to increase or decrease in a diameter.

Additionally, although the two deformation suppressing heads 13 and 14 are provided in the first embodiment, the six deformation suppressing heads 21 to 26 are provided in the second embodiment, the three deformation suppressing heads 31 to 33 are provided in the third embodiment, and the four deformation suppressing heads 41 to 44 are provided in the fourth embodiment, the present invention is not limited thereto. For example, an integrally formed annular deformation suppressing head may be prepared in FIG. 1 and may be brought into close contact with the outer circumferential portion of the annular second metallic member 101.

Additionally, as described above, the size of the deformation suppressing head in the metallic member press-in direction is not limited to those of the above respective embodiments as long as the size is within a range of plastic flow of a metallic member to be bonded.

Additionally, while in the first and second embodiments, the metallic members 100, 101, 103, and 104 to be bonded are provided with the tapered portions 100a, 101b, 103b, and 104a, the present invention may not necessarily require a tapered portion.

Conclusion

The metallic member bonding device according to one aspect of the present invention is a bonding device for pressing a first metallic member having a rod shape or a cylindrical shape into a hole portion of a second metallic member having an annular shape to bond the first metallic member and the second metallic member.

The first metallic member, which is one of the members to be bonded, is made of a first metallic material.

The second metallic member, which is the other member to be bonded, is made of a second metallic material different from the first metallic material and has the hole portion with a cross section smaller in size than a cross section of the first metallic member.

Then, the metallic member bonding device according to the present aspect includes a pressurizing unit, a current supply unit, and a deformation suppressing unit.

The pressurizing unit pressurizes the first metallic member toward the hole portion of the second metallic member to press the first metallic member therein.

The current supply unit supplies a welding current between the first metallic member and the second metallic member.

The deformation suppressing unit suppresses deformation of one of the first metallic member and the second metallic member, the one member having a constituent metallic material with at least one of a proof stress and a melting temperature lower than that of the other member, the deformation being in a direction of the cross section crossing a direction of the press-in.

Here, the deformation suppressing unit is provided in a region covering at least a plastic flow range in the press-in direction.

In the metallic member bonding device according to the present aspect, the deformation suppressing unit is provided which suppresses deformation, in the cross section direction, of a member having a constituent metallic material with at least one of a proof stress and a melting temperature lower than that of the other member. Therefore, it is possible to suppress deformation of the member with the lower value after pressing the first metallic member into the hole portion of the second metallic member by the pressurizing unit and starting a current flow.

Additionally, because the deformation suppressing unit is provided in a region covering the plastic flow range, generation and outward discharge of burrs can be effectively suppressed in the region.

Accordingly, at the time of bonding different kinds of metallic members (the first metallic member and the second metallic member) whose constituent metallic materials each have at least one of a proof stress and a melting temperature different from each other, the metallic member bonding device according to the present aspect enables suppression of an increase in an amount of upset while ensuring a high bonding strength.

A "range of plastic flow" can be experimentally or experientially set on the basis of physical properties, bonding conditions, environmental conditions, and the like of the first metallic material and the second metallic material, respectively.

Additionally, as the current supply unit, a current supply device for a known metallic member bonding device (condenser weld device) can be adopted. Specifically, the device includes an electrolytic condenser, a weld transformer, a discharge circuit, and a large current circuit, and once charges the electrolytic condenser with electric energy required for welding and discharges the electric energy to the transformer in a short period of time, thereby supplying a large current between the first metallic member and the second metallic member in a short period of time.

In the metallic member bonding device according to another aspect of the present invention, in the above configuration, the second metallic material has a proof stress and a melting temperature lower than those of the first metallic material, and the deformation suppressing unit applies a fastening load to the second metallic member from an outer circumferential portion of the second metallic member inwardly in the cross section direction.

As described above, in a case where the proof stress and the melting temperature of the second metallic material are lower than those of the first metallic material, when a current flow is started with pressure applied by the pressurizing unit, both inner and outer peripheries of the second metallic member tend to increase in length due to a temperature rise and an outward stress in the cross section direction. In other words, the second metallic member tends to increase in diameter.

However, in the metallic member bonding device according to the present aspect, since the second metallic member is fastened inwardly in the cross section direction from the outer circumferential portion thereof by the deformation suppressing unit, outward expansion of the second metallic member can be suppressed.

Accordingly, in the metallic member bonding device according to the present aspect, even when the second metallic member is formed of a material having relatively low proof stress and melting temperature, an increase in an amount of upset can be suppressed while ensuring a high bonding strength.

In the metallic member bonding device according to a further aspect the present invention, in the above configuration, application of the fastening load to the deformation suppressing unit is conducted in synchronization with pressing of the first metallic member into the hole portion of the second metallic member by the pressurizing unit.

In the metallic member bonding device according to the present aspect, since application of a fastening load and press-in can be conducted in synchronization with each other, a load for suppressing deformation can be applied at appropriate timing. It is therefore possible to efficiently suppress an increase in an amount of upset while ensuring a high bonding strength.

In the metallic member bonding device according to a still further aspect of the present invention, in the above configuration, the deformation suppressing unit has a plurality of deformation suppressing heads disposed in a state of surrounding the outer circumferential portion of the second metallic member, and has a pressing mechanism which presses each of the plurality of deformation suppressing heads inwardly in the cross section direction.

The metallic member bonding device according to the present aspect is assumed to have, as a specific configuration of the deformation suppressing unit, the plurality of deformation suppressing heads and the pressing mechanism which presses the plurality of deformation suppressing heads. This enables deformation of the second metallic member to be suppressed without using a complicated mechanism.

Additionally, since the outer circumferential portion of the second metallic member is pressed using the plurality of deformation suppressing heads, less non-uniform pressing is allowed to enable outward expansion of the second metallic member in the cross section direction to be uniformly suppressed.

As specific examples of the "pressing mechanism", a pneumatic cylinder, a hydraulic cylinder, an electric motor, and the like can be adopted or manual pressing is also possible via a linking mechanism or the like (more specifically, e.g., a configuration using a collet chuck).

In the metallic member bonding device according to a still further aspect of the present invention, in the above configuration, the second metallic material is a material containing aluminum and the first metallic material is a material containing iron.

In the metallic member bonding device according to the present aspect, also when bonding an aluminum-based material (a material containing aluminum) and an iron-based material (a material containing iron) having proof stresses and melting temperatures different from each other, an increase in an amount of upset can be suppressed while ensuring a high bonding strength.

In the metallic member bonding device according to a still further aspect of the present invention, in the above configuration, the first metallic material has a proof stress and a melting temperature lower than those of the second metallic material, the first metallic member has a cylindrical shape, and the deformation suppressing unit applies a load to the first metallic member outwardly in the cross section direction from an inner circumferential portion of the first metallic member.

In the metallic member bonding device according to the present aspect, even when a proof stress and a melting temperature of the first metallic material forming the first metallic member are lower than those of the second metallic material forming the second metallic member, an increase in an amount of upset can be suppressed while ensuring a bonding strength similarly to the above.

In the metallic member bonding device according to a still further aspect of the present invention, in the above configuration, application of the load by the deformation suppressing unit is conducted in synchronization with pressing of the first metallic member into the hole portion of the second metallic member by the pressurizing unit.

Also in the metallic member bonding device according to the present aspect, by conducting application of a load by the deformation suppressing unit and press-in in synchronization with each other, a load for suppressing deformation can be applied at appropriate timing. It is therefore possible to efficiently suppress an increase in an amount of upset while ensuring a high bonding strength.

The metallic member bonding method according to one aspect of the present invention is a method of pressing a first metallic member having a rod shape or a cylindrical shape into a hole portion of a second metallic member having an annular shape to bond the first metallic member and the second metallic member, the method including:

(i) a first metallic member preparation step of preparing the first metallic member made of a first metallic material;

(ii) a second metallic member preparation step of preparing the second metallic member made of a second metallic material different from the first metallic material and having the hole portion with a cross section smaller in size than a cross section of the first metallic member;

(iii) a pressurization step of pressurizing the first metallic member toward the hole portion of the second metallic member to press the first metallic member therein;

(iv) a current supply step of supplying a welding current between the first metallic member and the second metallic member; and (v) a deformation suppressing step of suppressing deformation, in a direction of the cross section, of one of the first metallic member and the second metallic member, the one member having a constituent metallic material with at least one of a proof stress and a melting temperature lower than the other member.

The metallic member bonding method according to the present aspect, deformation is suppressed in the press-in direction within a region covering at least a plastic flow range in the deformation suppressing step.

In the metallic member bonding method according to the present aspect, (v) the deformation suppressing step of suppressing deformation in the cross section direction is conducted for the member having a constituent metallic material with at least one of a proof stress and a melting temperature lower than that of the other member. Therefore, it is possible to suppress deformation of the member with the lower value after pressing the first metallic member into the hole portion of the second metallic member in (iii) the pressurization step and starting a current flow.

Additionally, since in (v) the deformation suppressing step, deformation is suppressed within a region covering a plastic flow range, generation and outward discharge of burrs can be effectively suppressed in the region.

Accordingly, the metallic member bonding method according to the present aspect enables, at the time of bonding different kinds of metallic members (the first metallic member and the second metallic member) having constituent metallic materials with at least one of a proof stress and a melting temperature different from each other, suppression of an increase in an amount of upset while ensuring a high bonding strength.

In the metallic member bonding method according to another aspect of the present invention, with the above method, the second metallic material has a proof stress and a melting temperature lower than those of the first metallic material, and in the deformation suppressing step, a fastening load is applied to the second metallic member from an outer circumferential portion of the second metallic member inwardly in the cross section direction.

As described above, in a case where the second metallic material has a proof stress and a melting temperature lower than those of the first metallic material, when a current flow is started while pressure is applied in the pressurization step, both inner and outer peripheries of the second metallic member tend to be increased in length due to a temperature rise and an outward stress in the cross section direction. In other words, a ring of the second metallic member tends to increase in diameter.

However, in the metallic member bonding method according to the present aspect, since the second metallic member is fastened from the outer circumferential portion thereof inwardly in the cross section direction in (v) the deformation suppressing step, outward expansion (an increase in the radius) of the second metallic member can be suppressed.

Accordingly, in the metallic member bonding method according to the present aspect, even when the second metallic member is formed of a material having relatively low proof stress and melting temperature, an increase in an amount of upset can be suppressed while ensuring a high bonding strength.

In the metallic member bonding method according to a further aspect of the present invention, with the above method, application of the fastening load in the deformation suppressing step is conducted in synchronization with pressing of the first metallic member into the hole portion of the second metallic member in the pressurization step.

In the metallic member bonding method according to the present aspect, by conducting application of a fastening load and press-in in synchronization with each other, a load for suppressing deformation can be applied at appropriate timing. It is therefore possible to efficiently suppress an increase in an amount of upset while ensuring a high bonding strength.

In the metallic member bonding method according to a still further aspect of the present invention, with the above method, in the deformation suppressing step, a plurality of deformation suppressing heads disposed in a state of surrounding the outer circumferential portion of the second metallic member is pressed inwardly in the cross section direction by a pressing mechanism connected to each of the plurality of deformation suppressing heads.

The metallic member bonding method according to the present aspect is assumed to have, as a specific method for conducting (v) the deformation suppressing step, the plurality of deformation suppressing heads pressed by the pressing mechanism. This enables deformation of the second metallic member to be suppressed while suppressing variation of a pressing force to be applied in each region of the outer circumferential portion.

Additionally, since the outer circumferential portion of the second metallic member is pressed using the plurality of deformation suppressing heads, less non-uniform pressing is allowed to enable outward expansion (an increase in the radius) of the second metallic member in the cross section direction to be uniformly suppressed.

The foregoing is also the case with specific examples of the pressing mechanism.

In the metallic member bonding method according to a still further aspect of the present invention, with the above method, the second metallic material is a material containing aluminum and the first metallic material is a material containing iron.

In the metallic member bonding method according to the present aspect, also when bonding an aluminum-based material (a material containing aluminum) and an iron-based material (a material containing iron) having proof stresses and melting temperatures different from each other, an increase in an amount of upset can be suppressed while ensuring a high bonding strength.

This application is based on Japanese Patent application No. 2016-165901 filed in Japan Patent Office on Aug. 26, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A metallic member bonding method of pressing a first metallic member having a rod shape or a cylindrical shape into a hole portion of a second metallic member having an annular structure itself to bond the first metallic member and the second metallic member, the method comprising:
   by defining a direction of the pressing as a first direction and a direction intersecting the first direction as a second direction, wherein the first direction and the second direction are perpendicular to each other, the first metallic member comprising a first metallic material, the second metallic member comprising a second metallic material, and the second metallic material has at least one of a proof stress and a melting temperature lower than the first metallic material;
   preparing the first metallic member made of the first metallic material;
   preparing the second metallic member made of the second metallic material different from the first metallic material and having the hole portion with a cross section smaller in size in the second direction than a cross section of the first metallic member;
   pressurizing the first metallic member toward the hole portion of the second metallic member to press the first metallic member therein;
   supplying a welding current between the first metallic member and the second metallic member; and
   preventing deformation of the second metallic member in the second direction and preventing the formation and outward discharge of burrs by making at least one deformation preventing head contact with a peripheral surface of the second metallic member on an outer side thereof and applying a fastening load to the second metallic member from the peripheral surface of the second metallic member on the outer side thereof inwardly in the second direction, the fastening load being sufficient to prevent deformation of the second metallic member while the first and second metallic members are bonded together,
   wherein in the preventing of the deformation of the second metallic member in the second direction, the deformation is prevented in the first direction within a region covering at least a plastic flow range, and the preventing of the deformation of the second metallic member does not include change due to plastic;
   wherein a pressing force and a pressing stroke of the at least one deformation preventing head is controlled such that an outer circumferential portion of the second metallic member is not reduced in diameter by a predetermined amount or more; and
   wherein a height of the at least one deformation preventing head is set to be equal to or larger than a height of the second metallic member.

2. The metallic member bonding method according to claim 1, wherein
   application of the fastening load in the preventing of the deformation of the second metallic member in the second direction is conducted in synchronization with pressing of the first metallic member into the hole portion of the second metallic member.

3. The metallic member bonding method according to claim 1, wherein
   in the preventing of the deformation of the second metallic member in the second direction, a plurality of deformation preventing heads is disposed in a state of surrounding the peripheral surface of the second metallic member on the outer side thereof, and is each pressed inwardly in the second direction by a pressing mechanism connected to each of the plurality of deformation preventing heads.

4. The metallic member bonding method according to claim 1, wherein
   the second metallic material is a material containing aluminum, and
   the first metallic material is a material containing iron.

5. The metallic member bonding method according to claim 3, wherein
   the plurality of deformation preventing heads lie adjacent to each other in a circumferential direction of the second metallic member, and each apply the fastening load to the second metallic member so as to be in contact with the second metallic member upon receiving a pressing force from the pressing mechanism.

6. The metallic member bonding method according to claim 5, wherein
   each of the plurality of deformation preventing heads is bonded with a pressing rod for transmitting the pressing force from the pressing mechanism to the deformation preventing head, and
   the second metallic member is placed on a base surface of a device base.

7. The metallic member bonding method according to claim 6, wherein
   the plurality of deformation preventing heads is configured to move forward and backward in the second direction in conjunction with a drive of the pressing mechanism.

8. The metallic member bonding method according to claim 1, wherein
   the first metallic member includes an end portion having an outer peripheral surface constituting a tapered surface to form a first tapered portion, the end portion being provided on a side to be pressed into the hole portion of the second metallic member and having a shape gradually narrowing toward an end thereof,
   the second metallic member includes the hole portion having a rim constituting a tapered surface to form a second tapered portion, the rim being provided in the hole portion on a side where the first metallic member is pressed in and having a shape gradually widening toward a first metallic member side, and
   a taper angle of the first tapered portion in the end portion of the first metallic member is the same as a taper angle of the second tapered portion in the hole portion of the second metallic member.

9. The metallic member bonding method according to claim 1, wherein the at least one deformation preventing head includes a first deformation preventing head and a second deformation preventing head, the first deformation preventing head and the second deformation preventing head each have a semi-annular shape when viewed in the first direction, and in the preventing of the deformation of the second metallic member in the second direction, the first deformation preventing head and the second deformation preventing head come into contact with the peripheral surface of the second metallic member in a state where the respective end sides thereof are opposed to each other.

10. The metallic member bonding method according to claim 1, wherein in the first direction, the at least one deformation preventing head is disposed in such a manner that a lower surface of the deformation preventing head is flush with a lower end surface of the second metallic member, and an upper surface of the deformation preventing head is above an upper end of the plastic flow range.

* * * * *